US012586723B2

(12) United States Patent
Kako et al.

(10) Patent No.: US 12,586,723 B2
(45) Date of Patent: Mar. 24, 2026

(54) THIN FILM HIGH POLYMER LAMINATED CAPACITOR

(71) Applicant: RUBYCON CORPORATION, Ina (JP)

(72) Inventors: Tomonao Kako, Shimoina-gun (JP); Chiharu Ito, Shimoina-gun (JP)

(73) Assignee: RUBYCON CORPORATION, Ina (JP)

( * ) Notice: Subject to any disclaimer, the term of this patent is extended or adjusted under 35 U.S.C. 154(b) by 225 days.

(21) Appl. No.: 18/509,921

(22) Filed: Nov. 15, 2023

(65) Prior Publication Data

US 2024/0087815 A1 Mar. 14, 2024

Related U.S. Application Data

(62) Division of application No. 17/535,781, filed on Nov. 26, 2021, now Pat. No. 11,854,748.

(51) Int. Cl.
| | |
|---|---|
| *H01G 4/18* | (2006.01) |
| *H01G 4/008* | (2006.01) |
| *H01G 4/012* | (2006.01) |
| *H01G 4/232* | (2006.01) |
| *H01G 4/30* | (2006.01) |

(52) U.S. Cl.
CPC .............. *H01G 4/18* (2013.01); *H01G 4/008* (2013.01); *H01G 4/012* (2013.01); *H01G 4/232* (2013.01); *H01G 4/306* (2013.01); *Y10T 29/435* (2015.01)

(58) Field of Classification Search
CPC .......... H01G 4/18; H01G 4/008; H01G 4/012; H01G 4/232; H01G 4/306; Y10T 29/435
See application file for complete search history.

(56) References Cited

U.S. PATENT DOCUMENTS

| | | | |
|---|---|---|---|
| 2004/0190221 A1* | 9/2004 | Yamaguchi .............. | H01G 4/30 361/306.3 |
| 2006/0214263 A1* | 9/2006 | Kojima .................... | H01G 4/30 257/532 |
| 2010/0008017 A1* | 1/2010 | Ito ............................ | H01G 4/30 361/301.4 |
| 2016/0111216 A1* | 4/2016 | Lee ........................ | H01G 4/232 361/301.4 |
| 2016/0196917 A1* | 7/2016 | Lim ....................... | H01G 4/012 361/301.4 |
| 2018/0061577 A1* | 3/2018 | Yasuda ................. | H01G 4/0085 |
| 2023/0268122 A1* | 8/2023 | Ikeda ..................... | H01G 2/065 361/301.4 |

* cited by examiner

*Primary Examiner* — Michael P Mcfadden
(74) *Attorney, Agent, or Firm* — HAUPTMAN HAM, LLP

(57) ABSTRACT

A thin film high polymer laminated capacitor includes: a laminated chip including dielectric layers, and internal electrode layers including first metal layers including a first metal vapor-deposited on the dielectric layers, and second metal layers including a second metal vapor-deposited on the first metal layers. The dielectric layers and the internal electrode layers are laminated and bonded alternately, and external electrodes are formed on one end and the other end of the laminated chip. The laminated chip includes a first region having the first metal layers formed on the dielectric layers, which are laminated alternately, and edge regions having the second metal layers formed on layers connected to the one end and layers connected to the other end in the first metal layers, which are laminated alternately, the first region having a capacitor function region, and the edge region having a heavy edge.

4 Claims, 6 Drawing Sheets

Z (laminated direction)

Y (length direction)

X (width direction)

Z (laminated direction)

X (width direction)

Z (laminated direction)

X (width direction)

THIN FILM HIGH POLYMER LAMINATED CAPACITOR

CROSS-REFERENCE TO RELATED APPLICATION

This is a divisional patent application of Ser. No. 17/535,781, filed on Nov. 26, 2021.

TECHNICAL FIELD

The present invention relates to a thin film high polymer laminated capacitor.

BACKGROUND ART

A thin film high polymer laminated capacitor includes a laminate excellent in interlayer adhesion formed by continuously vapor-depositing dielectric layers and internal electrode layers in vacuum, and has extremely excellent low distortion characteristics. A thin film high polymer laminated capacitor has a structure having external electrodes on one end and the other end of the laminate, and thereby is applicable to solder mounting and has a small size, a light weight, and a large capacity.

A monolithic capacitor having a heavy edge structure having internal electrode layers with edge parts having an increased thickness has been proposed (PTL 1: JP-A-62-245617).

A manufacturing method (and a manufacturing apparatus) has been proposed in which resin layers and thin metal film layer are formed alternately on a support rotated in a vacuum chamber to form a laminate, and an oil margin part is formed on the resin layer to pattern the thin metal film layer to a target shape (PTL 2: JP-A-2000-294449).

SUMMARY OF INVENTION

Technical Problem

PTL 1 describes that a larger amount of aluminum is vapor-deposited on the center part of each of the strips (which is the part becoming the heavy edge) by expanding the opening of the shadow mask, so as to increase the thickness of the vapor-deposited metal thickness. However, according to the studies by the present inventors, it has been newly found that the electrostatic capacity is decreased through the progress of lamination. Specifically, in expanding the opening of the center of the slit of the vapor deposition mask in the circumferential direction and the perpendicular direction, the thickness of the vapor-deposited metal forming the internal electrode layer is increased, but the vapor-deposited metal is accumulated on the boundary part of the slit of the vapor deposition mask through the progress of lamination, thereby narrowing the opening width of the slit, and consequently the width of the vapor-deposited metal in the capacitor region is narrowed through the progress of lamination, thereby decreasing the electrostatic capacitor.

Solution to Problem

The present invention has been made in view of the circumstances, and one or more aspects thereof are directed to a thin film high polymer laminated capacitor having a novel structure that is capable of achieving good contact to an external electrode and good withstanding voltage characteristics through a heavy edge structure, and is simultaneously capable of providing a target electrostatic capacity, and manufacturing method thereof.

The present invention has been accomplished under the solutions as disclosed below.

A thin film high polymer laminated capacitor according to one aspect of the present invention includes:

a laminated chip including
dielectric layers, and
internal electrode layers including first metal layers including a first metal vapor-deposited on the dielectric layers, and second metal layers including a second metal vapor-deposited on the first metal layers,
the dielectric layers and the internal electrode layers being laminated and bonded alternately, and
external electrodes formed on one end and the other end of the laminated chip,
the laminated chip having a first region having the first metal layers formed on the dielectric layers, which are laminated alternately, and edge regions having the second metal layers formed on layers connected to the one end and layers connected to the other end in the first metal layers, which are laminated alternately,
the first region having a capacitor function region, and the edge region having a heavy edge.

According to the aspect, the capacitor function region can have a laminated structure having a smaller electrode thickness than the edge regions, and the edge regions can have a heavy edge structure. Accordingly, good contact to an external electrode and good withstanding voltage characteristics can be obtained, and simultaneously a target electrostatic capacity can be obtained.

A manufacturing method of a thin film high polymer laminated capacitor according to another aspect of the present invention includes:

a first laminate manufacturing process including laminating and bonding dielectric layers and internal electrode layers alternately on an outer peripheral surface of a rotary drum rotated in a circumferential direction in a vacuum chamber, so as to manufacture a first laminate, the first laminate manufacturing process including:
vapor-depositing a monomer to form a monomer layer,
irradiating the monomer layer to form the dielectric layer,
coating an oil on the formed dielectric layer,
vapor-depositing a first metal on the dielectric layer having the oil coated thereon, so as to form a first metal layer, and
vapor-depositing a second metal on the formed first metal layer, so as to form a second metal layer,
the first laminate manufacturing process including:
continuously forming a first part for forming a capacitor function region and an edge part for forming a heavy edge.

According to the aspect, the first part for forming the capacitor function region can be laminated with a smaller electrode thickness than the edge part for forming the heavy edge, and the heavy edge having a larger electrode thickness than the electrode thickness in the capacitor function region can be formed and laminated. Accordingly, good contact to an external electrode and good withstanding voltage characteristics can be obtained, and simultaneously at target electrostatic capacity can be obtained.

It is preferred that the capacitor function region has a constant width in each of the layers. According to the structure, the electrostatic capacities of the capacitor function regions of the layers become constant, and therefore a target electrostatic capacity can be readily obtained.

It is preferred that in the first laminate manufacturing process, a vapor deposition mask is disposed between a second metal vapor deposition source for vapor-depositing the second metal and the rotary drum, so as to shield the first part and to form the edge part. According to the procedure, the heavy edge can be readily formed and laminated while laminating the layers in the capacitor function region having a constant width in the first part with a decreased electrode thickness.

Advantageous Effects of Invention

One or more aspects of the present invention can achieve a thin film high polymer laminated capacitor that is capable of achieving good contact to an external electrode and good withstanding voltage characteristics through an internal electrode having a heavy edge structure, and is simultaneously capable of providing a target electrostatic capacity.

DESCRIPTION OF EMBODIMENTS

Embodiments

Figure 1:
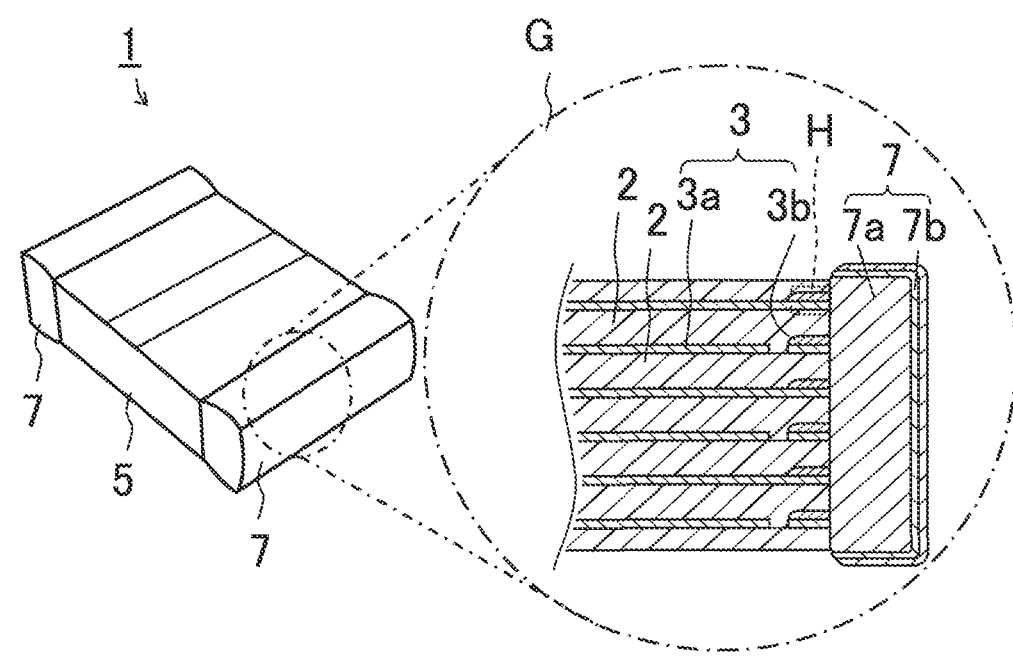
FIG. 1 is a schematic structural diagram showing a thin film high polymer laminated capacitor according to an embodiment of the present invention.
Figure 1:
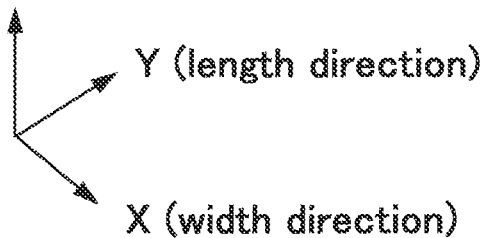

A structure of a thin film high polymer laminated capacitor 1 according to one embodiment of the present invention will be described. FIG. 1 is a schematic structural diagram showing the thin film high polymer laminated capacitor 1, in which the left hand diagram is a schematic perspective diagram, and the part G surrounded by the dashed-dotted line in the right hand diagram is a schematic enlarged partial cross-section diagram thereof. The thin film high polymer laminated capacitor 1 includes: a laminated chip 5 including dielectric layers 2 formed of a thin film high polymer, and internal electrode layers 3 including first metal layers 3a including a first metal vapor-deposited on the dielectric layers 2, and second metal layers 3b including a second metal vapor-deposited on the first metal layers 3a, which are laminated and bonded alternately, and external electrodes 7 formed on one end and the other end of the laminated chip 5. The external electrodes 7 each may have, for example, a first external electrode layer 7a formed through thermal spraying of a third metal and a second external electrode layer 7b formed through plating of a fourth metal.

Figure 2:
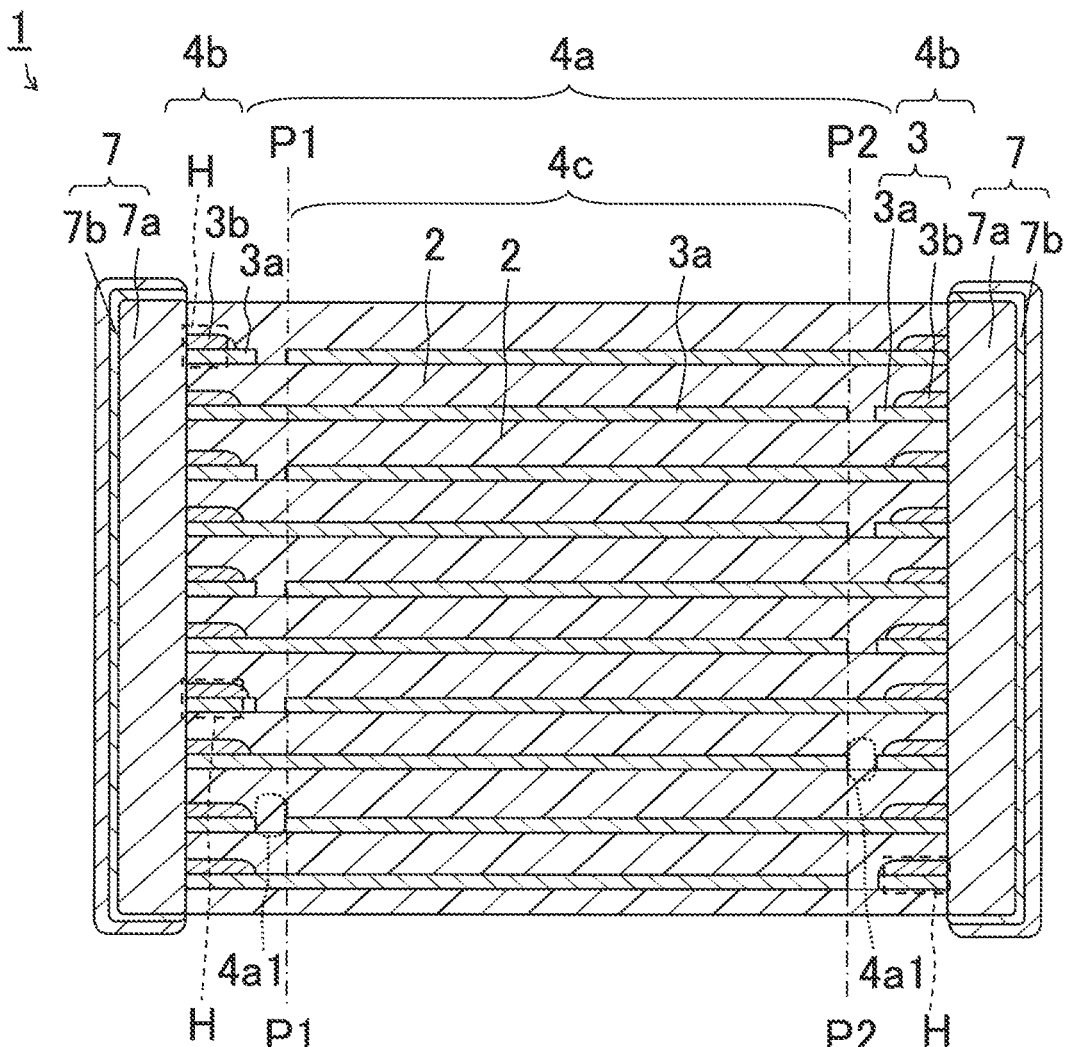
FIG. 2 is a schematic cross-section diagram showing one example of a thin film high polymer laminated capacitor according to the present embodiment.
Figure 3:
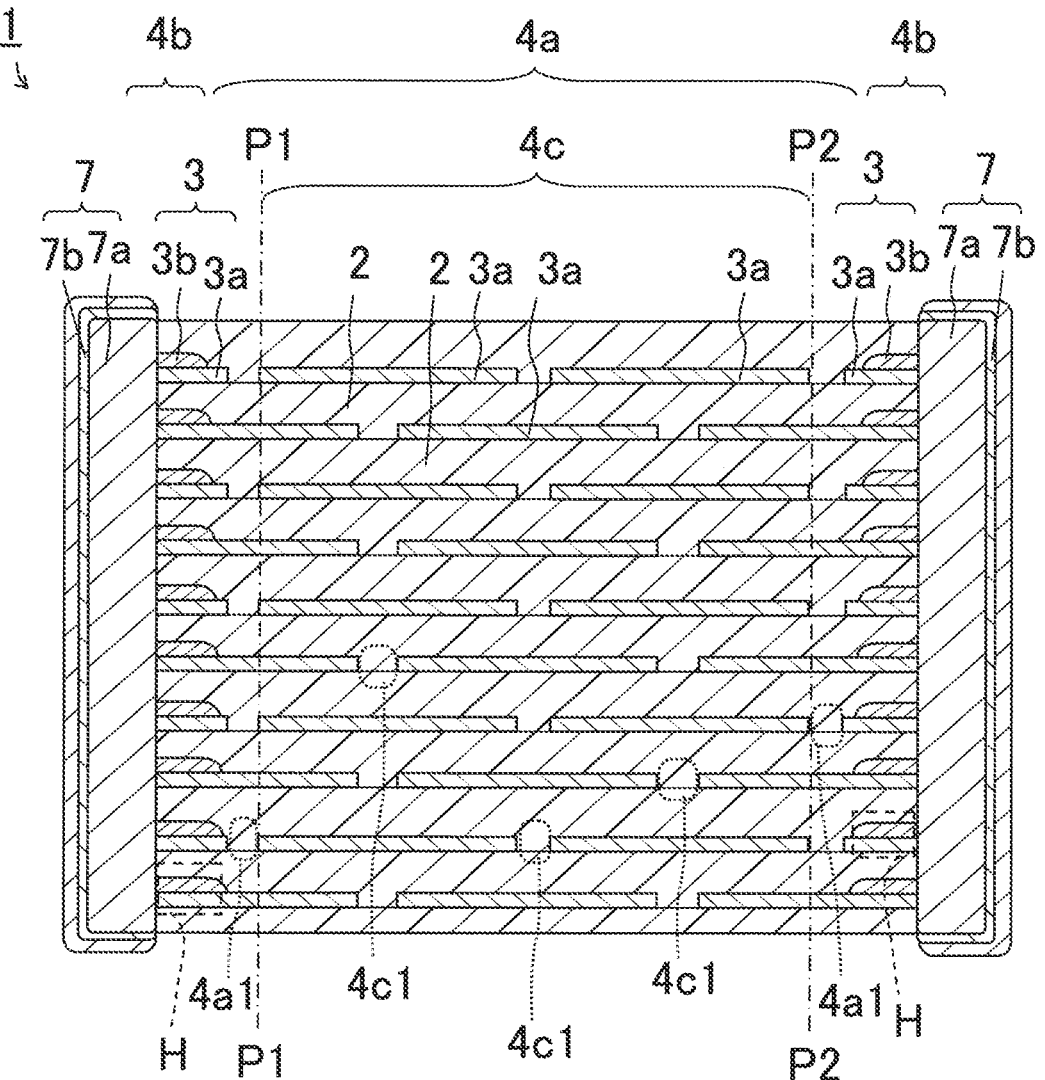
FIG. 3 is a schematic cross-section diagram showing another example of a thin film high polymer laminated capacitor according to the present embodiment.

The laminated chip 5 according to the present embodiment includes the dielectric layers 2 and the internal electrode layers 3, which are laminated and bonded alternately. The term "bonded" herein may also read "fixed", "bound", or "fused". In FIGS. 1 to 3, the directions are shown by the arrows X, Y, and Z for the purpose of convenience of illustration of the positional relationship of the members of the thin film high polymer laminated capacitor 1. In the use of the thin film high polymer laminated capacitor 1, the direction thereof is not limited to these directions, and may be any of these directions without problems. For the purpose of convenience of illustration, the arrow in the Z direction shows the lamination direction, the arrow in the X direction shows the width direction, and the arrow in the Y direction shows the length direction. In all the figures for describing the embodiments, members having the same function are attached with the same symbol, and repeated description therefor may be omitted in some cases.

As shown in FIGS. 2 and 3, the thin film high polymer laminated capacitor 1 has a first region 4a including the dielectric layer 2 and the first metal layer 3a, and edge regions 4b formed on one end and the other end of the first region 4a. The first region 4a has a capacitor function region 4c formed therein. The edge region 4b has a heavy edge H with the first metal layer 3a and the second metal layer 3b formed therein. Accordingly, the edge region 4b is an internal electrode having a heavy edge structure.

The capacitor function region 4c is a region having a capacitor function, and in the examples shown in FIGS. 2 and 3, is shown as the portion between the line P1 in the lamination direction passing through the end of the first metal layer 3a as the uppermost layer on the side close to the edge region 4b on the left side in the figures and the line P2 in the lamination direction passing through the end of the first metal layer 3a as the lowermost layer on the side close to the edge region 4b on the right side in the figures. The heavy edge H is shown by the portion surrounded by the broken line in the figures.

According to the present embodiment, the capacitor function region 4c can be laminated with a smaller electrode thickness than the edge region 4b, and the edge region 4b can be an internal electrode having a heavy edge structure having a larger thickness than the electrode thickness in the capacitor function region 4c. The lamination can be achieved in the state where the heavy edge H is formed in the internal electrode, and therefore a target electrostatic capacity can be readily obtained, and simultaneously good contact to the external electrode 7 and good withstanding voltage characteristics can be obtained.

In the example shown in FIG. 2, a first inner margin part 4a1 is formed in the first region 4a. According to the structure, the electrostatic capacity can be increased while retaining the insulation region.

In the example shown in FIG. 3, the first inner margin part 4a1 is formed in the first region 4a. In the example shown in FIG. 3, a second inner margin part 4c1 is formed in the capacitor function region 4c, and simultaneously the capacitor function region 4c has a structure including plural capacitor elements connected in series. Accordingly, the capacitor function region 4c has an internal series structure. According to the structure, the electrostatic capacity can be increased while retaining the insulation region, and a further high withstanding voltage capability can be obtained. The thin film high polymer laminated capacitor is not limited to the aforementioned structures.

In the capacitor function region 4c in the present embodiment, the layers have a constant width. Even in the case where the distance between the heavy edge H and the heavy edge H in each of the internal electrodes of the layers is increased due to the progress of lamination, the capacitor function regions 4c in each of the layers have a constant width.

In the example shown in FIG. 2, the outer edge of the first metal layer 3a of the uppermost layer close to the edge region 4b on the left side in the figure, the outer edge of the first metal layer 3a of the third top layer close to the edge region 4b on the left side in the figure, . . . , and the outer edge of the metal layer 3a of the second bottom layer close to the edge region 4b on the left side in the figure are all formed along the line P1 in the lamination direction.

In the example shown in FIG. 2, the outer edge of the first metal layer 3a of the lowermost layer close to the edge region 4b on the right side in the figure, the outer edge of the first metal layer 3a of the third bottom layer close to the edge region 4b on the right side in the figure, . . . , and the outer edge of the first metal layer 3a of the second top layer close to the edge region 4b on the right side in the figure are all formed along the line P2 in the lamination direction. In the examples shown in FIGS. 2 and 3, the line P1 and the line P2 are in parallel to each other.

The first metal layer 3a is preferably formed of aluminum, zinc, copper, gold, silver, or an alloy containing these metals. The second metal layer 3b is preferably formed of aluminum, zinc, copper, gold, silver, or an alloy containing these metals. According to the configuration, an internal electrode having high conductivity can be obtained. For example, the internal electrode layer 3 is formed of aluminum, zinc, copper, gold, silver, or an alloy containing these metals.

The electrode resistance of the first metal layer 3a in the capacitor function region 4c is preferably more than 4 Ω/sq. According to the configuration, a target withstanding voltage can be readily achieved. The electrode resistance of the first metal layer 3a is more preferably 5 Ω/sq. or more. The electrode resistance of the first metal layer 3a is further preferably 20 Ω/sq. or more. With a higher electrode resistance of the first metal layer 3a, a higher withstanding voltage can be obtained. In the manufacturing method described later, the operation may be controlled to increase the electrode resistance of the first metal layer 3a, for example, by increasing the rotation speed in the circumferential direction of a rotary drum 12, a higher withstanding voltage can be achieved.

The electrode resistance of the first metal layer 3a in the capacitor function region 4c is preferably 45 Ω/sq. or less. According to the configuration, a better moisture resistance can be obtained, and a target electrostatic capacity and a target dielectric loss tangent (tan δ) can be readily achieved. The electrode resistance of the first metal layer 3a is more preferably 40 Ω/sq. or less. The electrode resistance of the first metal layer 3a is further preferably 20 Ω/sq. or less. In the manufacturing method described later, the operation may be controlled to decrease the electrode resistance of the first metal layer 3a, for example, by decreasing the rotation speed in the circumferential direction of the rotary drum 12, a target electrostatic capacity and a target dielectric loss tangent (tan δ) can be readily achieved, and a further lower equivalent series resistance (low ESR) can be achieved.

The electrode resistance of the heavy edge H in the edge region 4b is preferably less than 30 Ω/sq. According to the configuration, a target electrostatic capacity and a target dielectric loss tangent (tan δ) can be readily achieved. The electrode resistance of the heavy edge H is more preferably 20 Ω/sq. or less. The electrode resistance of the heavy edge H is further preferably 10 Ω/sq. or less. In the manufacturing method described later, the operation may be controlled to decrease the electrode resistance of the heavy edge H, for example, by decreasing the rotation speed in the circumferential direction of the rotary drum 12, or by expanding a through hole 19a of a vapor deposition mask 19 in the circumferential direction, a target electrostatic capacity and a target dielectric loss tangent (tan δ) can be readily achieved. The electrode resistance of the heavy edge H in the edge region 4b is naturally smaller than the electrode resistance of the first metal layer 3a in the capacitor function region 4c.

The electrode resistance of the heavy edge H in the edge region 4b is preferably 1 Ω/sq. or more. According to the configuration, the manufacturing cost can be readily decreased by suppressing the extra electrode material. For example, the electrode resistance of the heavy edge H is 4 Ω/sq. or more.

The dielectric layer 2 is preferably formed through polymerization of one or more of tricyclodecane dimethanol dimethacrylate and tricyclodecane dimethanol diacrylate. According to the configuration, high heat resistance can be obtained, and a target electrostatic capacity and a target dielectric loss tangent (tan δ) can be readily achieved.

The external electrode 7 preferably has the first external electrode layer 7a formed through thermal spraying of a third metal on the side surface in contact with the end of the edge region 4b on one side and on the side surface in contact with the end of the edge region 4b on the other side, and the second external electrode layer 7b formed through plating of a fourth metal on the outer side of the first external electrode layer 7a. According to the structure, a structure excellent in solderability in mounting can be readily achieved. For example, the first external electrode layer 7a may be brass, zinc, aluminum, or other known sprayed metals. For example, the second external electrode layer 7b may be copper, tin, gold, silver, or other known plated metals.

A manufacturing method for a thin film high polymer laminated capacitor 1 according to one embodiment will be then described below.

The thin film high polymer laminated capacitor 1 may be manufactured through a first laminate manufacturing process, a capacitor bar cutting process, an external electrode forming process, a chip cutting process, a voltage treatment process, and an inspection process, in this order.

Figure 4A:
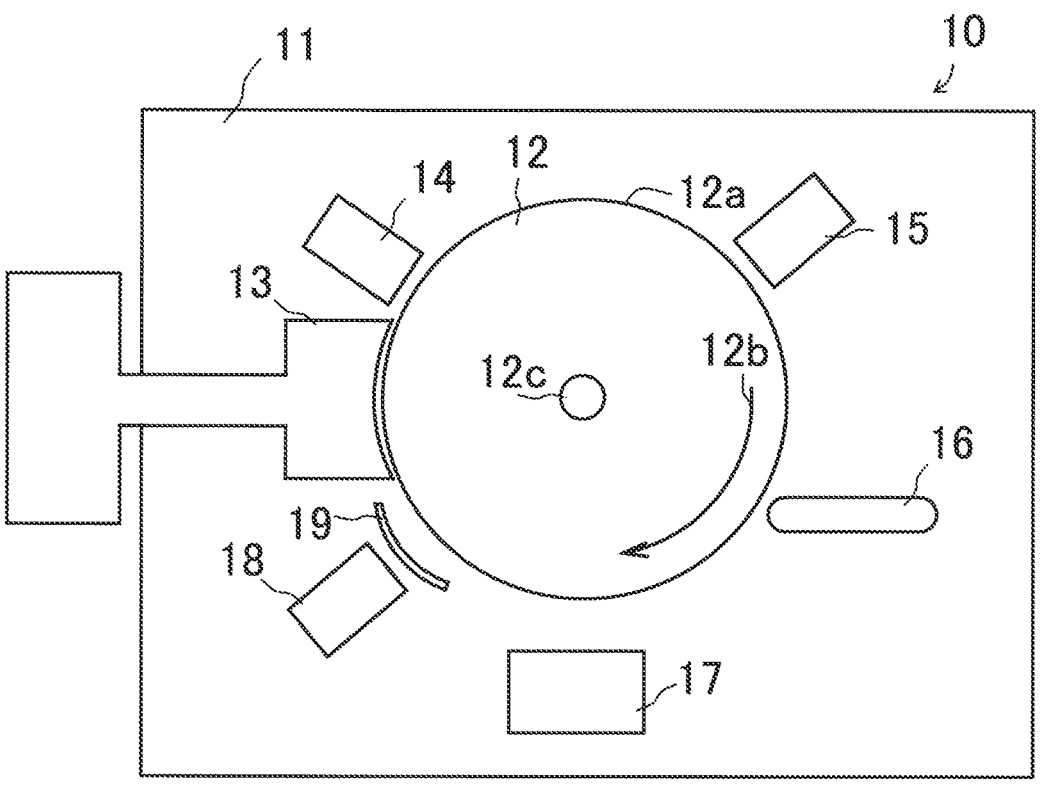
FIG. 4A is a structural diagram schematically showing a structure of a first laminate manufacturing apparatus for a thin film high polymer laminated capacitor according to the present embodiment.

FIG. 4A is a structural diagram schematically showing a structure of a first laminate manufacturing apparatus 10 for the thin film high polymer laminated capacitor 1. The first laminate manufacturing apparatus 10 has a vacuum chamber 11, and the rotary drum 12 being disposed in the vacuum chamber 11 and rotated in the circumferential direction shown by an arrow 12b with a rotation axis 12c as the center. The first laminate manufacturing apparatus 10 also has a monomer vapor deposition device 13, an electron beam irradiation device 14, a plasma process device 15, a patterning device 16, a first metal vapor deposition source 17, and a second metal vapor deposition source 18, which are directed to an outer peripheral surface 12a of the rotary drum 12 and disposed in this order in the circumferential direction shown by the allow 12b.

Figure 4B:
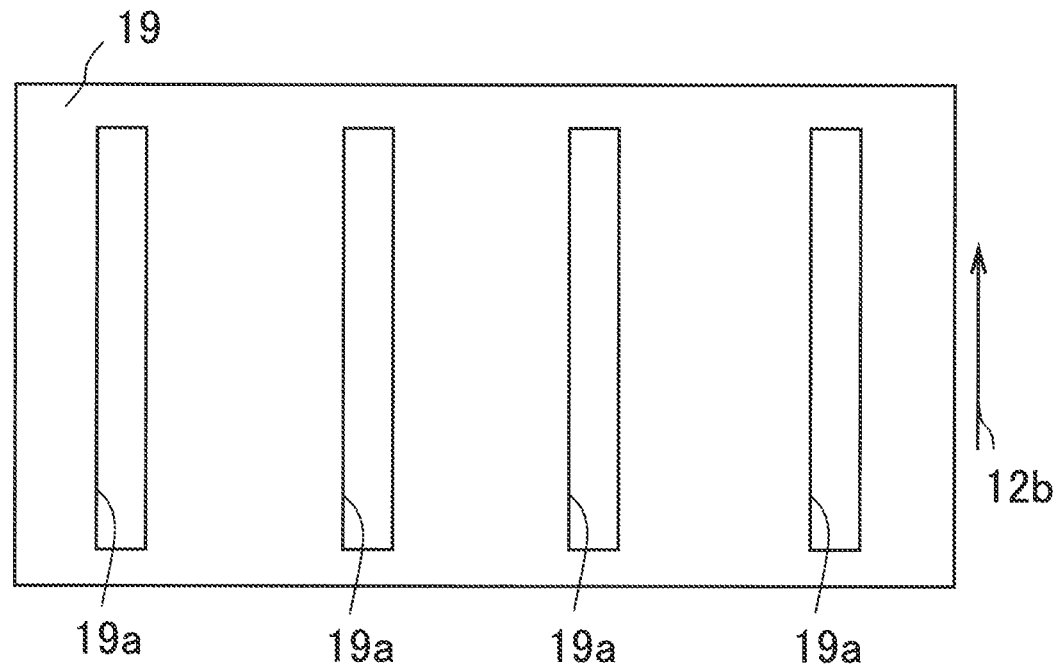
FIG. 4B is a schematic plane diagram showing a vapor deposition mask in the first laminate manufacturing apparatus shown in FIG. 4A.

In the example shown in FIG. 4A, a vapor deposition mask 19 is disposed between the second metal vapor deposition source 18 and the rotary drum 12. FIG. 4B is a schematic plane diagram showing the vapor deposition mask 19. The vapor deposition mask 19 may be a heat resistant metal plate formed of a stainless steel, a nickel alloy, or the like, having plural through holes 19a, which each are a rectangular slit in the circumferential direction (i.e., the direction shown by the arrow 12b) formed through etching, laser work, or the like, and the through holes 19a are disposed with a prescribed interval.

In the first laminate manufacturing process, while rotating the rotary drum 12 in the vacuum chamber 11 in the first laminate manufacturing apparatus 10 in the circumferential direction shown by the allow 12b, the dielectric layers 2 and the internal electrode layers 3 are laminated and bonded alternately on the outer peripheral surface 12a of the rotary drum 12, so as to manufacture the first laminate 5a.

FIGS. 5A to 5D are schematic cross-section diagrams showing the lamination state of the dielectric layers 2 and the internal electrode layers 3 on the outer peripheral surface 12a of the rotary drum 12 in the first laminate manufacturing process.

Figure 5A:
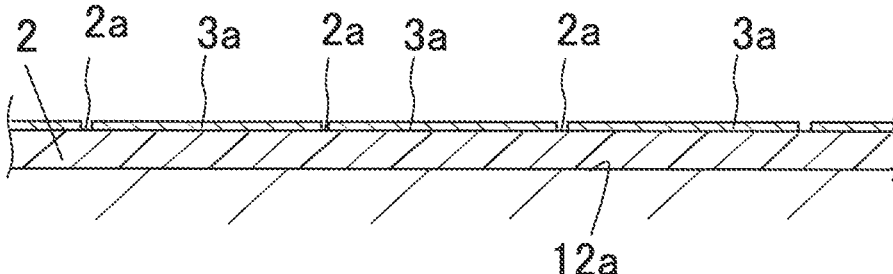
FIG. 5A is a schematic cross-section diagram showing a state where an oil margin part is formed on a dielectric layer, and a first metal layer is formed in a first laminate manufacturing process according to the present embodiment.

As shown in FIG. 5A, a monomer is vapor-deposited on the outer peripheral surface 12a of the rotary drum 12 with the monomer vapor deposition device 13 to form a monomer layer, and the monomer layer is irradiated with an electron beam with the electron beam irradiation device 14 to form the dielectric layer 2. The surface of the dielectric layer 2 is then subjected to an oxygen plasma treatment with the plasma process device 15, so as to modify the dielectric layer 2. An oil 2b is coated on the dielectric layer 2 with the patterning device 16, and the first metal is vapor-deposited thereon with the first metal vapor deposition source 17, so as to form the first metal layer 3a having an oil margin part 2a formed thereon.

Figure 5B:
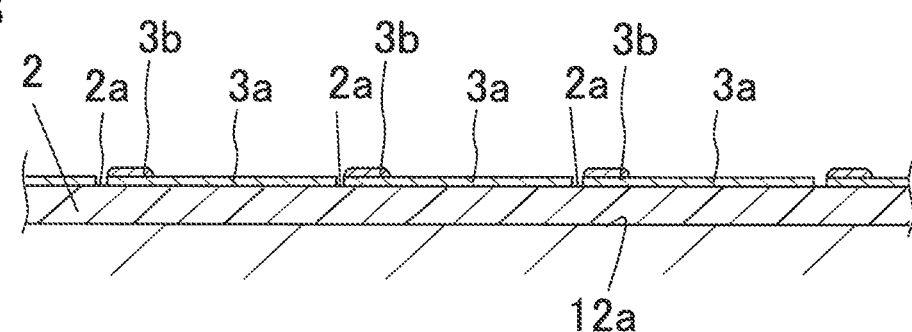
FIG. 5B is a schematic cross-section diagram showing a state subsequent to FIG. 5A where a second metal layer is formed, and an internal electrode layer is formed.

As shown in FIG. 5B, subsequent to FIG. 5A, the second metal is vapor-deposited with the second metal vapor deposition source 18 to form the second metal layer 3b, resulting in the internal electrode layer 3. In the formation of the internal electrode layer 3, the vapor deposition mask 19 is used for shielding a first part 8a and for forming an edge part 8b (see FIG. 5D).

Figure 5C:
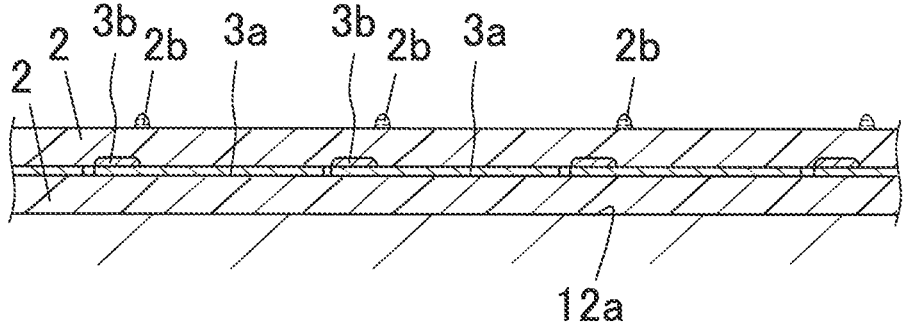
FIG. 5C is a schematic cross-section diagram showing a state subsequent to FIG. 5B where a dielectric layer is formed, and an oil is coated.
Figure 5D:
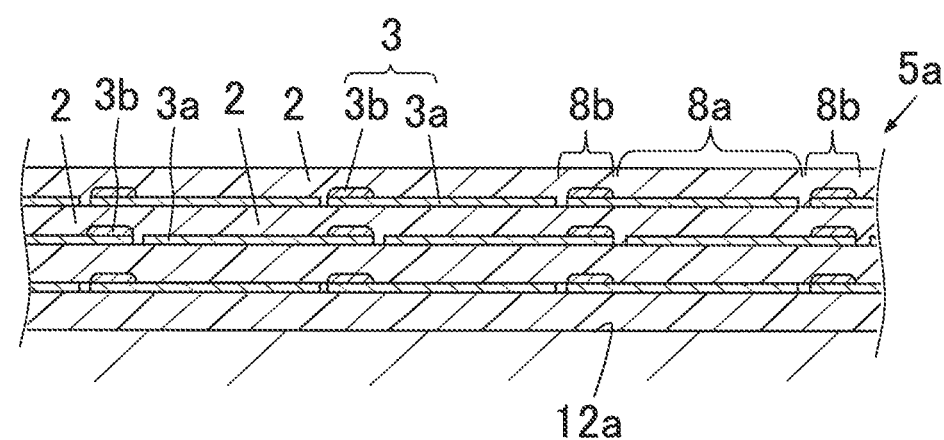
FIG. 5D is a schematic cross-section diagram showing a state where a first laminate is formed in the first laminate manufacturing process.

As shown in FIG. 5C, subsequent to FIG. 5B, in the same procedure as in FIG. 5A, the dielectric layer 2 is formed on the outer peripheral surface 12a of the rotary drum 12, the dielectric layer 2 is modified, the oil 2b is coated thereon, and the first metal is vapor-deposited thereon with the first metal vapor deposition source 17, so as to form the first metal layer 3a having the oil margin part 2a formed thereon. The procedures in FIGS. 5A to 5C are repeated to laminate and bond the dielectric layers 2 and the internal electrode layers 3 alternately, so as to provide a first laminate 5a as shown in FIG. 5D. The number of lamination herein may be, for example, 3 layers or more and 10,000 layers or less.

According to the present embodiment, the first part 8a for forming the capacitor function region 4c can be laminated with a smaller electrode thickness than the edge part 8b for forming the heavy edge H, and the heavy edge H can be formed and laminated on the edge region 4b. Accordingly, the thin film high polymer laminated capacitor 1 having such a structure that a target electrostatic capacity can be readily obtained, and good contact to the external electrode 7 and good withstanding voltage characteristics can be readily obtained.

The heavy edge technique using a shadow mask described in PTL 1 involves an issue that the part to be a heavy edge is necessarily moved in every lamination. In the present embodiment, on the other hand, there is no necessity of moving the relative position of the vapor deposition mask 19 with respect to the rotary drum 12 in the direction perpendicular to the circumferential direction shown by the allow 12b. Accordingly, the productivity can be enhanced.

In addition to the manufacturing procedures described above, there may be a case where the first metal is vapor-deposited with the first metal vapor deposition source 17 to form the first metal layer 3a, the oil 2b is coated with the patterning device, and the second metal is vapor-deposited with the second metal vapor deposition source 18 to form the second metal layer 3b, and in this case, a heavy edge H having a narrower width can be readily obtained.

The first laminate 5a manufactured in the first laminate manufacturing process is, for example, flattened with a press device, and then for example, cut into a workpiece having a prescribed size in a card form with a card cutting device. The workpiece in a card form is then divided through the capacitor bar cutting process.

Figure 6A:
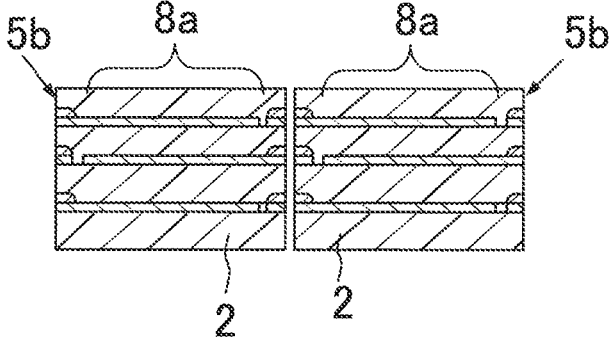
FIG. 6A is a schematic cross-section diagram showing a state where a second laminate is formed through a capacitor bar cutting process.

In the capacitor bar cutting process subsequent to the first laminate manufacturing process, as shown in FIG. 6A, the first laminate 5a is divided at the edge part 8b in FIG. 5D to be the edge region 4b into one end and the other end of the first part 8a in the first laminate 5a, so as to provide a second laminate 5b.

Figure 6B:
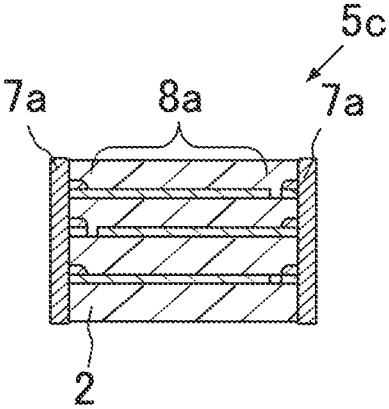
FIG. 6B is a schematic cross-section diagram showing a state where a third laminate is formed by forming a first external electrode through an external electrode forming process.

In the external electrode forming process subsequent to the capacitor bar cutting process, as shown in FIG. 6B, a first external electrode layer 7a is formed with a third metal on each of the side surface on one end and the side surface on the other end disposed by dividing the edge part 8b in the second laminate 5b, so as to provide a third laminate 5c. For example, the first external electrode layer 7a is formed through thermal spraying of the third metal with a known metal thermal spraying device (which is not shown in the figure). For example, the first external electrode layer 7a is deburred.

Figure 6C:
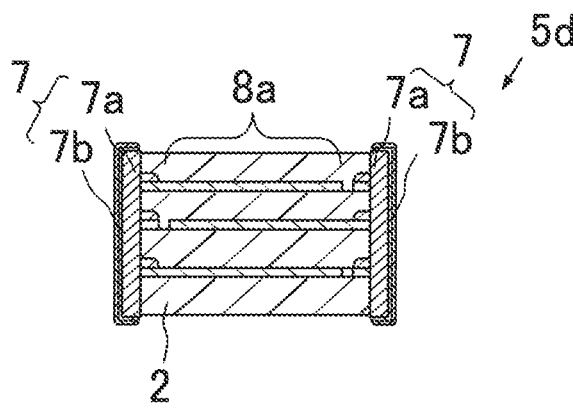
FIG. 6C is a schematic cross-section diagram showing a state where a fourth laminate is formed by forming a second external electrode through the external electrode forming process.

In the external electrode forming process, after forming the first external electrode layer 7a, as shown in FIG. 6C, the second external electrode layer 7b is formed with a fourth metal on the first external electrode layer 7a in the third laminate 5c, so as to form the external electrode 7 including the first external electrode layer 7a and the second external electrode layer 7b, resulting in a fourth laminate 5d. For example, the fourth metal is plated with a known plating device to form the second external electrode layer 7b (which is not shown in the figure).

In the chip cutting process subsequent to the external electrode forming process, the external electrode 7 in the fourth laminate 5d is divided to form the laminated chip 5. For example, a known chip cutting device is applied (which is not shown in the figure). Subsequent to the chip cutting process, for example, the laminated chip 5 is rinsed and dried. Thereafter, in the voltage treatment process, a prescribed voltage is applied for a prescribed period of time with a known voltage applying device (which is not shown in the figure). In the inspection process subsequent to the voltage treatment process, the laminated chip is inspected for prescribed electric characteristics and appearance characteristics with a known inspection device (which is not shown in the figure). Thereafter, the laminated chip is subjected to a delivery inspection and then delivered.

Subsequently, Examples 1 to 4 and Comparative Examples 1 to 3 of the thin film high polymer laminated capacitor 1 will be described below.

Example 1

In this example, in manufacturing the first laminate 5a by laminating and bonding the dielectric layers 2 and the internal electrode layers 3 alternately on the outer peripheral surface 12a of the rotary drum 12 while rotating the rotary drum 12 in the circumferential direction shown by the allow 12b in the vacuum chamber 11 in the first laminate manufacturing apparatus 10, the oil margin part 2a was formed, the first metal layer 3a was formed, and the second metal layer 3b was formed with the vapor deposition mask 19, so as to form the internal electrode layer 3. In this example, tricyclodecane dimethanol dimethacrylate was used as the monomer, and the thickness of the dielectric layer in each of the layers was 0.8 μm. Aluminum was vapor-deposited as the first metal to form the first metal layer 3a, and zinc was vapor-deposited as the second metal to form the second metal layer 3b. The number of lamination was 3,000, and the thickness of the laminated chip 5 was approximately 2.5 mm. In this example, the manufacturing condition was controlled to regulate the electrode resistance of the first metal layer 3a to 30 Ω/sq., and the electrode resistance of the heavy edge H to 4 Ω/sq.

Example 2

In this example, aluminum was vapor-deposited as the second metal to form the second metal layer 3b. In this example, the manufacturing condition was controlled to regulate the electrode resistance of the first metal layer 3a to 30 Ω/sq., and the electrode resistance of the heavy edge H to 4 Ω/sq. The manufacturing condition was finely adjusted to make the same configuration as in Example 1 except for the above.

Example 3

In this example, the manufacturing condition was controlled in such a manner that the rotation speed in the circumferential direction of the rotary drum 12 was increased, and simultaneously the through hole 19a of the vapor deposition mask 19 was expanded in the circumferential direction, as compared to the manufacturing condition in Example 1, so as to regulate the electrode resistance of the first metal layer 3a to 45 Ω/sq., and the electrode resistance of the heavy edge H to 4 Ω/sq. The manufacturing condition was finely adjusted to make the same configuration as in Example 1 except for the above.

Example 4

In this example, the through hole 19a of the vapor deposition mask 19 was shortened in the circumferential direction as compared to the manufacturing condition in Example 1 for decreasing the thickness of the second metal layer 3b, so as to regulate the electrode resistance of the first metal layer 3a to 30 Ω/sq., and the electrode resistance of the heavy edge H to 20 Ω/sq. The manufacturing condition was finely adjusted to make the same configuration as in Example 1 except for the above.

Subsequently, thin film high polymer laminated capacitors of Comparative Examples 1 to 3 prototyped in parallel to Examples 1 to 4 described above will be described below.

Comparative Example 1

In this comparative example, according to the manufacturing method of PTL 1, an internal electrode layer having a heavy edge was formed by expanding the center opening of the vapor deposition mask in the circumferential direction and the perpendicular direction. However, the second metal was not vapor-deposited. The monomer used was tricyclodecane dimethanol dimethacrylate, and the thickness of the dielectric layer in the layers was 0.8 μm. Aluminum was vapor-deposited as the first metal to form the internal electrode layer 3. The number of lamination was 3,000, and the thickness of the laminated chip 5 was approximately 2.5 mm. In this comparative example, the manufacturing condition was controlled to regulate the electrode resistance of the portion of the internal electrode layer except for the heavy edge to 30 Ω/sq., and the electrode resistance of the heavy edge to 4 Ω/sq.

Comparative Example 2

In this comparative example, the second metal was not vapor-deposited, the heavy edge was not formed, and the electrode resistance of the internal electrode layer was 30 Ω/sq. The manufacturing condition was finely adjusted to make the same configuration as in Example 1 except for the above.

Comparative Example 3

In this comparative example, the manufacturing condition was controlled in such a manner that the rotation speed in the circumferential direction of the rotary drum 12 was decreased as compared to the manufacturing condition in Comparative Example 2 for increasing the thickness of the first metal layer, so as to regulate the electrode resistance of the internal electrode layer to 4 Ω/sq. The manufacturing condition was finely adjusted to make the same configuration as in Comparative Example 2 except for the above.

The first laminates of Examples 1 to 4 and Comparative Examples 1 to 3 each were flattened and heat-treated, the capacitor bars thereof each were cut, an external electrode was formed, and then the chips each were cut to provide capacitor elements. The size of the capacitor element was 8.2 mm×7.1 mm×2.6 mm. Thereafter, the prescribed voltage treatment was performed for providing target capacitor characteristics.

The capacitors obtained by the methods of Examples 1 to 4 and Comparative Examples 1 to 3 each were measured for the electrostatic capacity and the dielectric loss tangent (tan δ) at a frequency of 1 kHz, and the breakdown voltage. The acceptance standards of the capacitor characteristics assuming that the target electrostatic capacity is 2.0 to 2.5 μF are an electrostatic capacity of 2.5 μF±20%, tan δ of 1.5% or less, and a breakdown voltage of 160 V or more. The measurement results are shown in Table 1.

Table 1

TABLE 1

| | | | | | |
|---|---|---|---|---|---|
| average values (n = 10) | | | | | |
| | electrode resistance of the first metal layer [Ω/sq] | electrode resistance of the heavy edge [Ω/sq] | Capacitance [μF] | tan δ | breakdown voltage [V] |
| Example 1 | 30 | 4 | 2.54 | 0.78 | 360 |
| Example 2 | 30 | 4 | 2.56 | 0.78 | 358 |
| Example 3 | 45 | 4 | 2.28 | 1.09 | 385 |
| Example 4 | 30 | 20 | 2.53 | 0.98 | 349 |
| Comparative Example 1 | 30 | | 1.73 | 0.81 | 373 |
| Comparative Example 2 | 30 | — | 1.86 | 1.62 | 346 |
| Comparative Example 3 | 4 | — | 2.55 | 0.76 | 104 |

As shown in Table 1, Examples 1 to 4 all satisfied the acceptance standards.

On the other hand, Comparative Example 1 had a decreased electrostatic capacity. This was caused because the width of the vapor-deposited metal of the capacitor function region in the internal electrode layer was gradually narrowed through the progress of lamination. Comparative Example 2 had a decreased dielectric capacity and an increased dielectric loss tangent. This was caused because the electrode thickness of the internal electrode layer was small, and thus the contact to the external electrode was deteriorated at the edge part, resulting in high resistance and disconnection. Comparative Example 3 had a decreased breakdown voltage. This was caused because the thickness of the electrode of the internal electrode layer was large, and thus the healing capability was deteriorated.

In addition to the manufacturing methods exemplified in Examples 1 to 4, the withstanding voltage capability can be enhanced by providing an internal series structure in Examples 1 to 4. For example, the capacitor may be manufactured in such a manner that the distance between the heavy edge H and the heavy edge H in each of the layers may be increased through the progress of lamination, and thereby the capacitor function region 4c can be sufficiently secured. For example, the manufacturing condition may be controlled in such a manner that the rotation speed in the circumferential direction of the rotary drum 12 is increased to decrease the thickness of the electrode, and thereby the electrode resistance can be regulated to a target higher value. For example, the manufacturing condition may be controlled in such a manner that the rotation speed in the circumferential direction of the rotary drum 12 is decreased to increase the thickness of the electrode, and thereby the electrode resistance can be regulated to a target lower value. The present invention is not limited to the examples described above, and may be subjected to various modifications within a range that does not deviate from the present invention.

What is claimed is:

1. A thin film high polymer laminated capacitor comprising:
   a laminated chip including
      dielectric layers, and
      internal electrode layers including first metal layers including a first metal vapor-deposited on the dielectric layers, and second metal layers including a second metal vapor-deposited on the first metal layers,
      the dielectric layers and the internal electrode layers being laminated and bonded alternately, and
   external electrodes formed on one end and the other end of the laminated chip,
   the laminated chip having a first region having the first metal layers formed on the dielectric layers, which are laminated alternately, and edge regions having the second metal layers formed on layers connected to the one end and layers connected to the other end in the first metal layers, which are laminated alternately,
   the first region having a capacitor function region, and the edge region having a heavy edge,
   the capacitor function region has a constant width in each laminated pair of the first metal layers and the dielectric layers, and
   a distance between the heavy edge on one side and the heavy edge on another side in one layer increases as the alternating lamination progresses.

2. The thin film high polymer laminated capacitor according to claim 1, wherein the first metal layer is formed of aluminum, zinc, copper, gold, silver, or an alloy containing these metals, and the second metal layer is formed of aluminum, zinc, copper, gold, silver, or an alloy containing these metals.

3. The thin film high polymer laminated capacitor according to claim 1, wherein the first metal layer has an electrode resistance of more than 4 Ω/sq, and the heavy edge has an electrode resistance of less than 30 Ω/sq.

4. The thin film high polymer laminated capacitor according to claim 1, wherein the external electrode has a first external electrode layer formed through thermal spraying of a third metal on side surfaces in contact with ends of the edge regions on both sides, and a second external electrode layer formed through plating of a fourth metal on an outer side of the first external electrode layer.

* * * * *